(12) United States Patent
Tseng et al.

(10) Patent No.: US 9,142,974 B2
(45) Date of Patent: Sep. 22, 2015

(54) CONFIGURABLE POWER SUPPLY SYSTEM

(71) Applicant: Energy Pass Incorporation, Hsinchu (TW)

(72) Inventors: Hsueh-Wen Tseng, Hsinchu County (TW); Chia-Hsieh Wu, Changhua County (TW); Chao-Hsuan Liu, New Taipei (TW); Ying-Che Lo, Tainan (TW)

(73) Assignee: Energy Pass Incorporation, Hsinchu Science Park, Hsinchu (TW)

( * ) Notice: Subject to any disclaimer, the term of this patent is extended or adjusted under 35 U.S.C. 154(b) by 412 days.

(21) Appl. No.: 13/628,008

(22) Filed: Sep. 26, 2012

(65) Prior Publication Data

US 2014/0084847 A1    Mar. 27, 2014

(51) Int. Cl.
*H02J 7/00* (2006.01)
(52) U.S. Cl.
CPC .......................................... *H02J 7/00* (2013.01)
(58) Field of Classification Search
CPC ............................................................ H02J 7/00
USPC .................. 320/107, 109, 134; 219/484, 504
See application file for complete search history.

(56) References Cited

U.S. PATENT DOCUMENTS

| 5,504,416 A | 4/1996 | Holloway |
| 2003/0048006 A1* | 3/2003 | Shelter et al. .................... 307/64 |
| 2007/0190848 A1* | 8/2007 | Zhang .............................. 439/500 |
| 2009/0020346 A1* | 1/2009 | Krauer et al. ................. 180/65.2 |

FOREIGN PATENT DOCUMENTS

| CN | 201038795 Y | 3/2008 |
| TW | 201143257 | 12/2011 |
| TW | M417716 | 12/2011 |
| TW | 201208228 | 2/2012 |

* cited by examiner

*Primary Examiner* — Mohammed Alam
(74) *Attorney, Agent, or Firm* — Winston Hsu; Scott Margo

(57) ABSTRACT

A configurable power supply system is disclosed. The configurable power supply system comprises a power source for providing input power, a switch, coupled to the power source, for enabling a bypass path for outputting the input power to an output node as an output power when turned on; a rechargeable battery module for storing the input power for outputting a battery power; a charging unit, coupled between the power source and the rechargeable battery module, for charging the rechargeable battery module with the input power; a converting unit, coupled to the rechargeable battery module, for converting the battery power to generate the output power; and a control unit, coupled to the switch, the charging unit, and the converting unit, for controlling functions of the switch, the charging unit, and the converting unit.

13 Claims, 8 Drawing Sheets

CONFIGURABLE POWER SUPPLY SYSTEM

BACKGROUND OF THE INVENTION

1. Field of the Invention

The present invention relates to a power supply system, and more particularly, to a configurable power supply system capable of providing power configuration between a rechargeable battery module and a bypass path, and flexibility between battery power charging mode and bypass power charging mode.

2. Description of the Prior Art

A power management system is widely utilized in most of electronic devices. With the improvement of semiconductor processes, the size of integrated circuit (IC) becomes smaller, and most devices require low power consumption. Therefore, a high efficiency power supply system becomes a basic requirement.

On the other hand, a rechargeable battery device is widely utilized in a portable device, such as a mobile phone, a platform, a laptop, etc. When portable devices become popularized, the quality and power efficiency of a rechargeable battery power supply system are more and more important. To charge a rechargeable battery, a charger converts input voltage provided by a power source to a voltage compatible with the rechargeable battery and output the voltage to the rechargeable battery, so as to store electricity in the rechargeable battery. When a portable device is equipped with the rechargeable battery and turned on, a regulator converts and outputs electricity stored in the rechargeable battery to the portable device. In such a condition, the regulator may be a boost converter for boosting the voltage of the battery power to provide power with a higher voltage to the portable device. For example, please refer to FIG. 1, which illustrates a conventional battery power supply system 10. In the battery power supply system 10, a power source provides input power Vin with voltage 5V to a charger 104, and the charger 104 converts the input voltage from 5V to 3.7V in conformation with a rechargeable battery 102. Then, the rechargeable battery 102 provides power with voltage 3.7V, and a boost converter 106 converts the voltage from 3.7V to 5V to provide output power Vout.

However, there may be power loss during the power conversion. For example, in the battery power supply system 10, the charger 104 converts the 5V input power to the 3.7V battery power, which causes power loss and reduces power efficiency. In addition, the boost converter 106 converts the 3.7V battery power to the 5V output power, which also causes power loss and reduces power efficiency. The power efficiency reduction will cause some drawbacks such as rising temperature, reduced battery life, increasing charging time. Thus, there is a need for improvement of the prior art.

SUMMARY OF THE INVENTION

It is therefore an objective of the present invention to provide a configurable power supply system capable of providing power configuration between a rechargeable battery module and a bypass path, and flexibility between battery power charging mode and bypass power charging mode.

The present invention discloses a configurable power supply system, which comprises a power source for providing input power; a switch, coupled to the power source, for enabling a bypass path for outputting the input power to an output node as an output power when turned on; a rechargeable battery module for storing the input power for outputting a battery power; a charging unit, coupled between the power source and the rechargeable battery module, for charging the rechargeable battery module with the input power; a converting unit, coupled to the rechargeable battery module, for converting the battery power to generate the output power; and a control unit, coupled to the switch, the charging unit, and the converting unit, for controlling functions of the switch, the charging unit, and the converting unit.

The present invention further discloses a method of configuring power supply. The method comprises providing input power; enabling a bypass path for outputting the input power to an output node as an output power; charging a rechargeable battery module with the input power for storing the input power for outputting a battery power; and converting the battery power to generate the output power.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
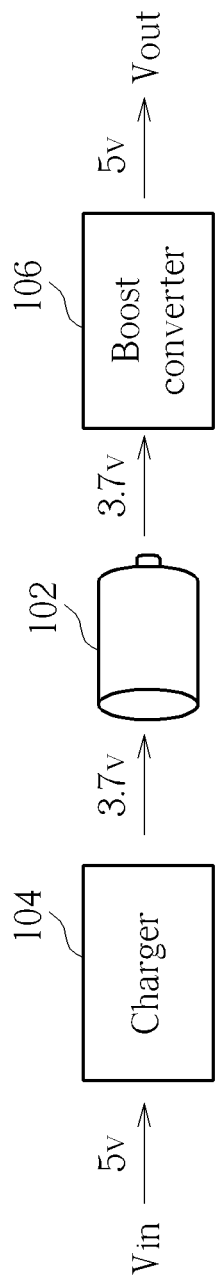
FIG. 1 illustrates a conventional battery power supply system.
Figure 2:
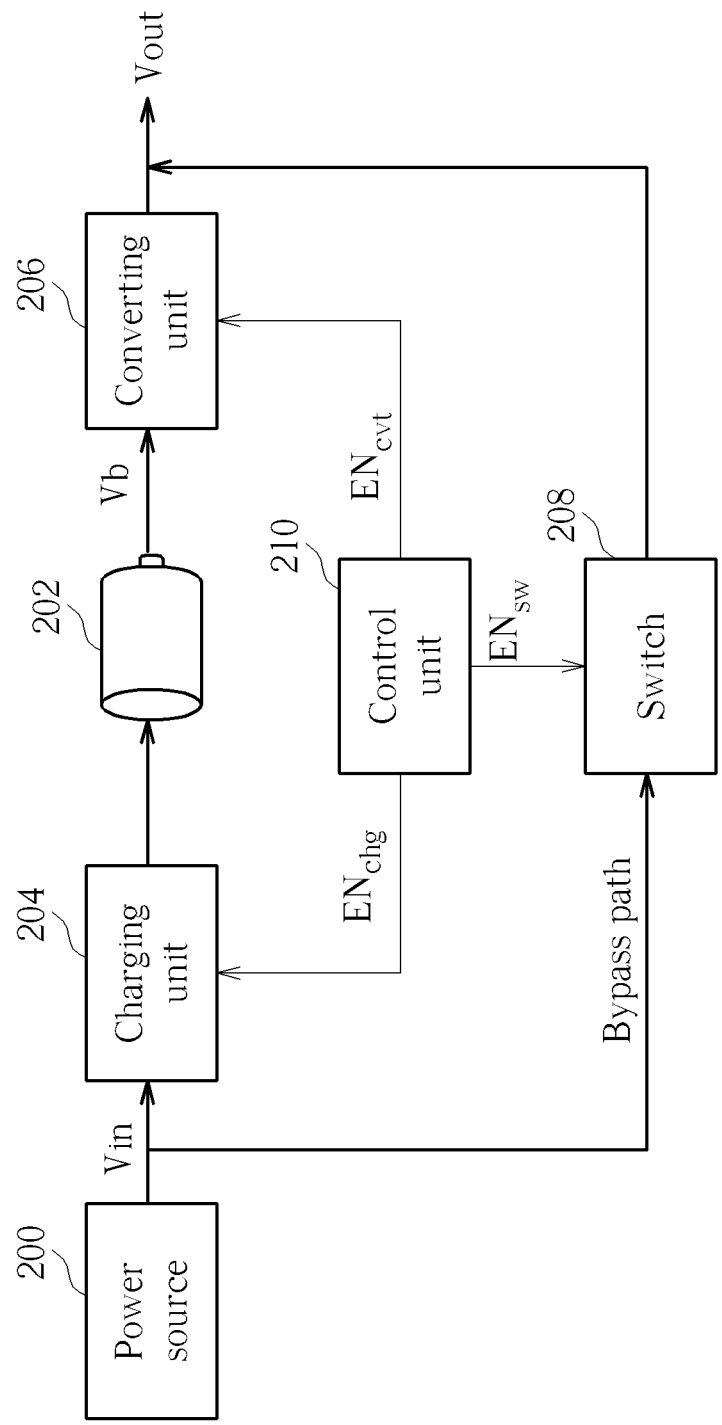
FIG. 2 is a power supply system according to an embodiment of the present invention.

Please refer to FIG. 2, which is a power supply system 20 according to an embodiment of the present invention. As shown in FIG. 2, the power supply system 20 includes a power source 200, a rechargeable battery module 202, a charging unit 204, a converting unit 206, a switch 208, and a control unit 210. The power source 200 provides input power Vin, and can be any device which can provide voltages and currents to other electronic devices. The rechargeable battery module 202 is utilized for storing the input power Vin and outputting battery power Vb. The charging unit 204, coupled between the power source 200 and the rechargeable battery module 202, is utilized for charging the rechargeable battery module 202 with the input power Vin. The converting unit 206, coupled to the rechargeable battery module 202, is utilized for converting the battery power Vb to generate output power Vout. When the voltage of the output power Vout is greater than the voltage of the battery power Vb, the converting unit 206 may be a boost converter for boosting the voltage of the battery power Vb to generate the output power Vout. When the voltage of the output power Vout is smaller than the voltage of the battery power Vb, the converting unit 206 may be a buck converter for reducing the voltage of the battery power Vb to generate the output power Vout. When the voltage of the output power Vout is close to the voltage of the battery power Vb, the converting unit 206 may be a regulator or a switch. In some cases, the converting unit 206 may be a buck-boost converter for generating the output power with an output voltage either greater than or smaller than the voltage of the battery power Vb. In general, the converting unit 206 generates the output power according to system requirements on the output voltage.

Please keep referring to FIG. 2. The switch 208 is coupled to the power source 200. When the switch 208 is turned on, a bypass path is enabled for outputting the input power Vin to an output node as the output power Vout. When the switch 208 is turned off, the bypass path is disabled and no input power pass through the switch 208 to the output node. The switch 208 may be implemented with a metal-oxide-semiconductor field effect transistor (MOSFET) or other transistors which can be turned on or off for enabling or disabling the pass through current, and will not be limited herein. The control unit 210, coupled to the charging unit 204, the converting unit 206, and the switch 208, is utilized for controlling functions of the charging unit 204, the converting unit 206, and the switch 208. In detail, the control unit 210 may control the charging unit 204 with a control signal $EN_{chg}$, control the converting unit 206 with a control signal $EN_{cvt}$, and control the switch 208 with a control signal $EN_{sw}$. The control signal $EN_{chg}$ may control the charging unit 204 to start or stop charging the rechargeable battery module 202, the control signal $EN_{cvt}$ may control the converting unit 206 to be turned on or off, and the control signal $EN_{sw}$ may control the switch 208 to be turned on or off. The control unit 210 may be a microcontroller unit (MCU) or other control circuit which is capable of switching control signals under different conditions, and will not be limited herein.

Please note that, the on/off status of the control signals $EN_{chg}$, $EN_{cvt}$, and $EN_{sw}$ can be classified into 8 cases. However, the converting unit 206 and the switch 208 may not be turned on at the same time, since a conflict may occur at the output node when the converting unit 206 and the switch 208 are turned on at the same time if the voltage of the battery power Vb and the voltage of the input power Vin are different, i.e. the control signals $EN_{cvt}$ and $EN_{sw}$ may not be on at the same time. Therefore, at least 6 cases are feasible and will be narrated hereinafter.

Figure 3:
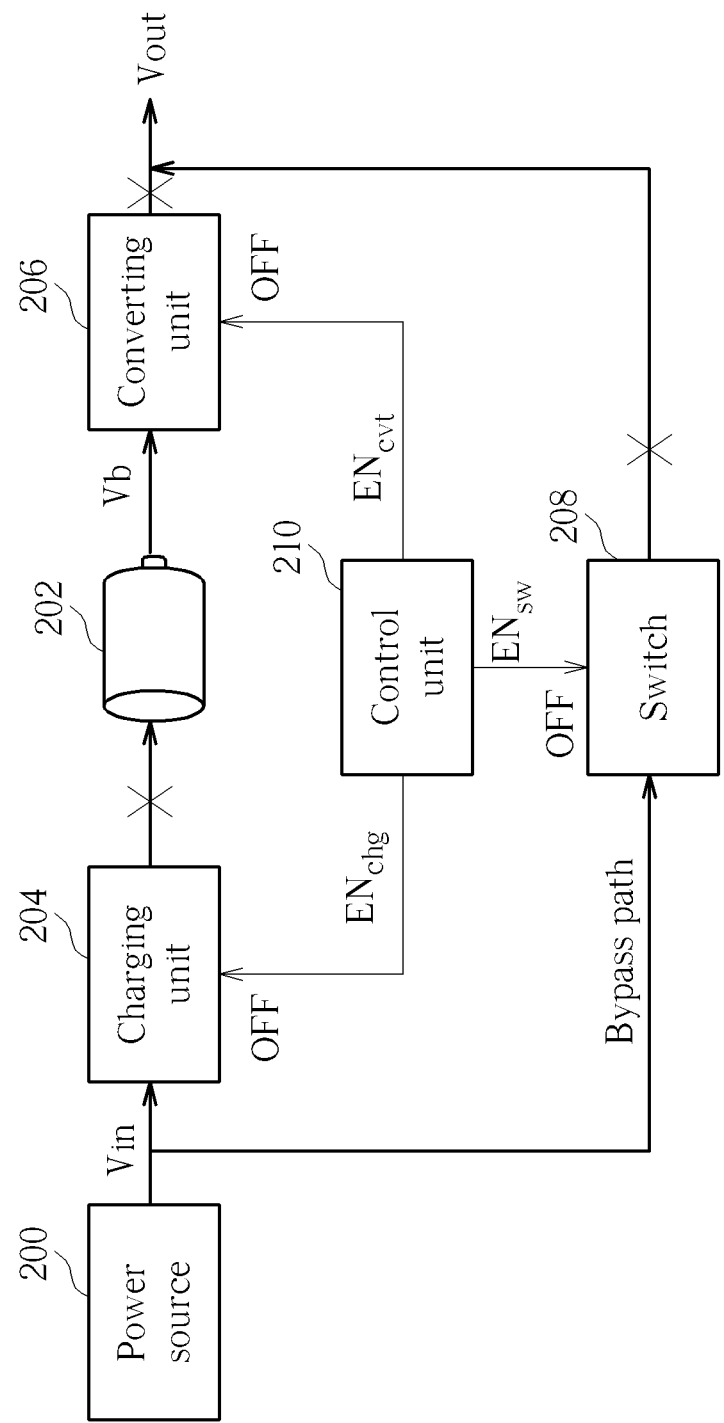
FIG. 3 is a schematic diagram of a function of the power supply system according to a first embodiment of the present invention.

Please refer to FIG. 3, which is a schematic diagram of a function of the power supply system 20 according to a first embodiment of the present invention. As shown in FIG. 3, the control signals $EN_{chg}$, $EN_{cvt}$, and $EN_{sw}$ are all off. In such a condition, the charging unit 204 stops charging the rechargeable battery module 202, the converting unit 206 is turned off, and the switch 208 is turned off. FIG. 3 illustrates a shut-down status of the output power Vout. The control signals $EN_{cvt}$ and $EN_{sw}$ are both off, indicating that no output power Vout is provided. The control signal $EN_{chg}$ is also off since either the power source 200 is not ready or the quantity of electric charges in the rechargeable battery module 202 is already full.

Figure 4:
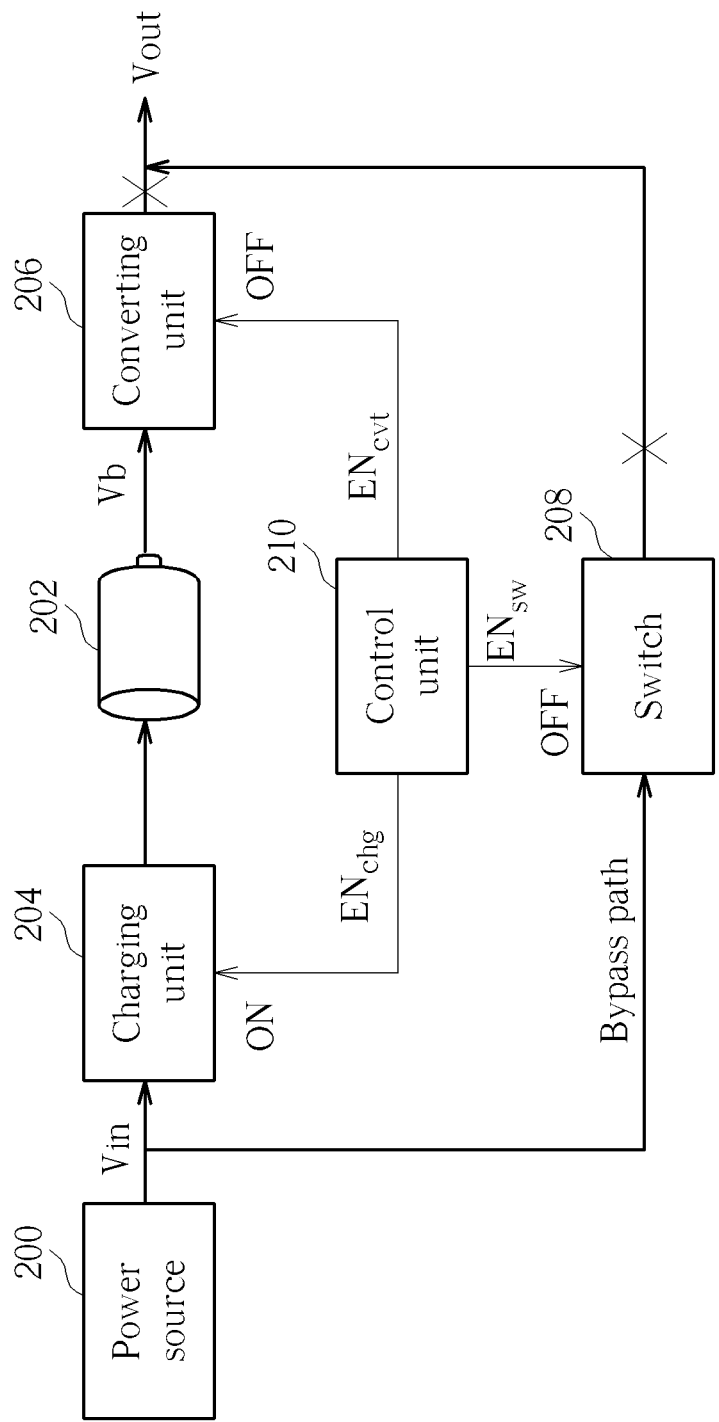
FIG. 4 is a schematic diagram of a function of the power supply system according to a second embodiment of the present invention.

Please refer to FIG. 4, which is a schematic diagram of a function of the power supply system 20 according to a second embodiment of the present invention. As shown in FIG. 4, the control signal $EN_{chg}$ is on, $EN_{cvt}$ is off, and $EN_{sw}$ is off. In such a condition, the charging unit 204 is charging the rechargeable battery module 202, the converting unit 206 is turned off, and the switch 208 is turned off. FIG. 4 also illustrates a shut-down status of the output power Vout. The control signals $EN_{cvt}$ and $EN_{sw}$ are both off, indicating that no output power Vout is provided. The control signal $EN_{chg}$ is on, indicating that the power source 200 is ready and the rechargeable battery module 202 is charged by the charging unit 204.

Figure 5:
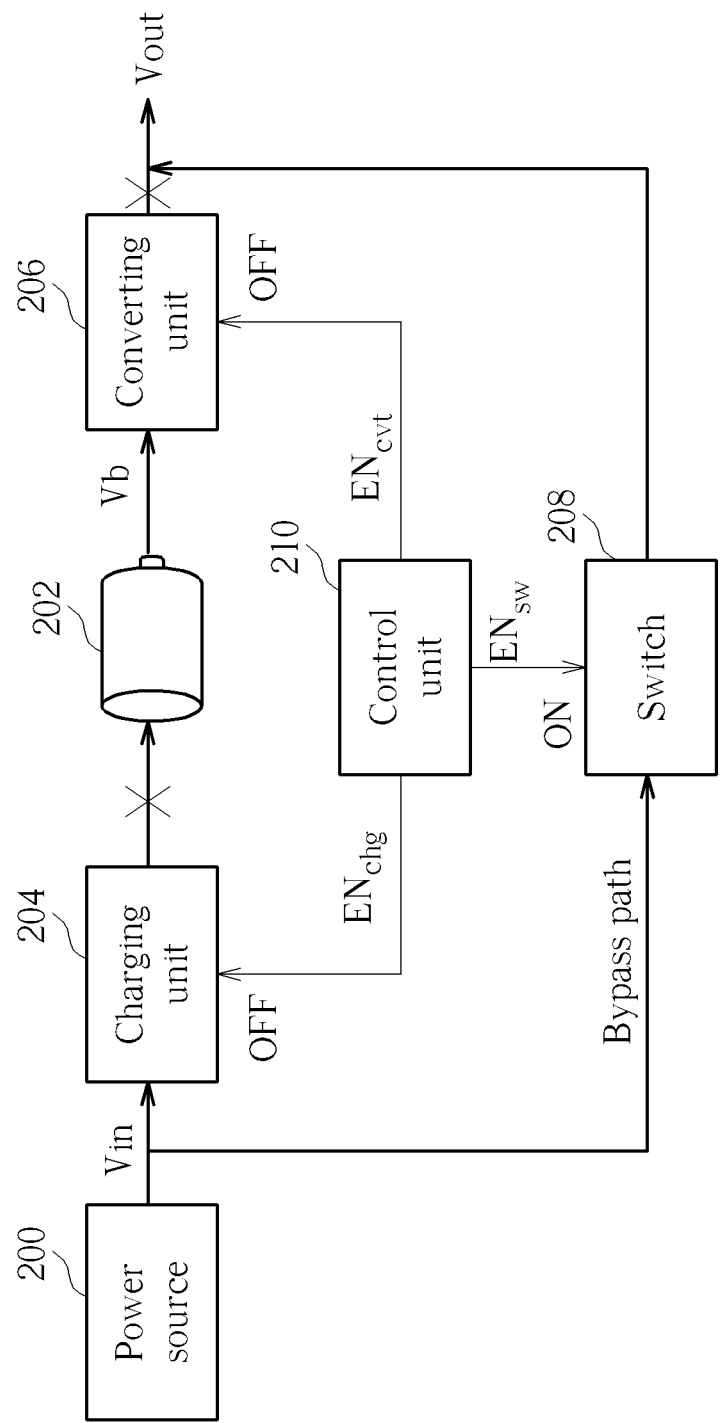
FIG. 5 is a schematic diagram of a function of the power supply system according to a third embodiment of the present invention.

Please refer to FIG. 5, which is a schematic diagram of a function of the power supply system 20 according to a third embodiment of the present invention. As shown in FIG. 5, the control signal $EN_{chg}$ is off, $EN_{cvt}$ is off, and $EN_{sw}$ is on. In such a condition, the charging unit 204 stops charging the rechargeable battery module 202, the converting unit 206 is turned off, and the switch 208 is turned on. The control signal $EN_{sw}$ is on, indicating that the power source 200 provides the output power Vout through the switch 208. In this case, the voltage requirement for the output power Vout is close to the voltage of the input power Vin. Therefore, the switch 208 may be turned on, and a bypass path is enabled for outputting the input power Vin to the output node as the output power Vout. The control signal $EN_{chg}$ is off since the quantity of electric charges in the rechargeable battery module 202 is already full. As a result, the output current can go through the bypass path (i.e. bypass power) and power efficiency may be increased. Therefore, temperature may fall, and battery life may be increased.

Figure 6:
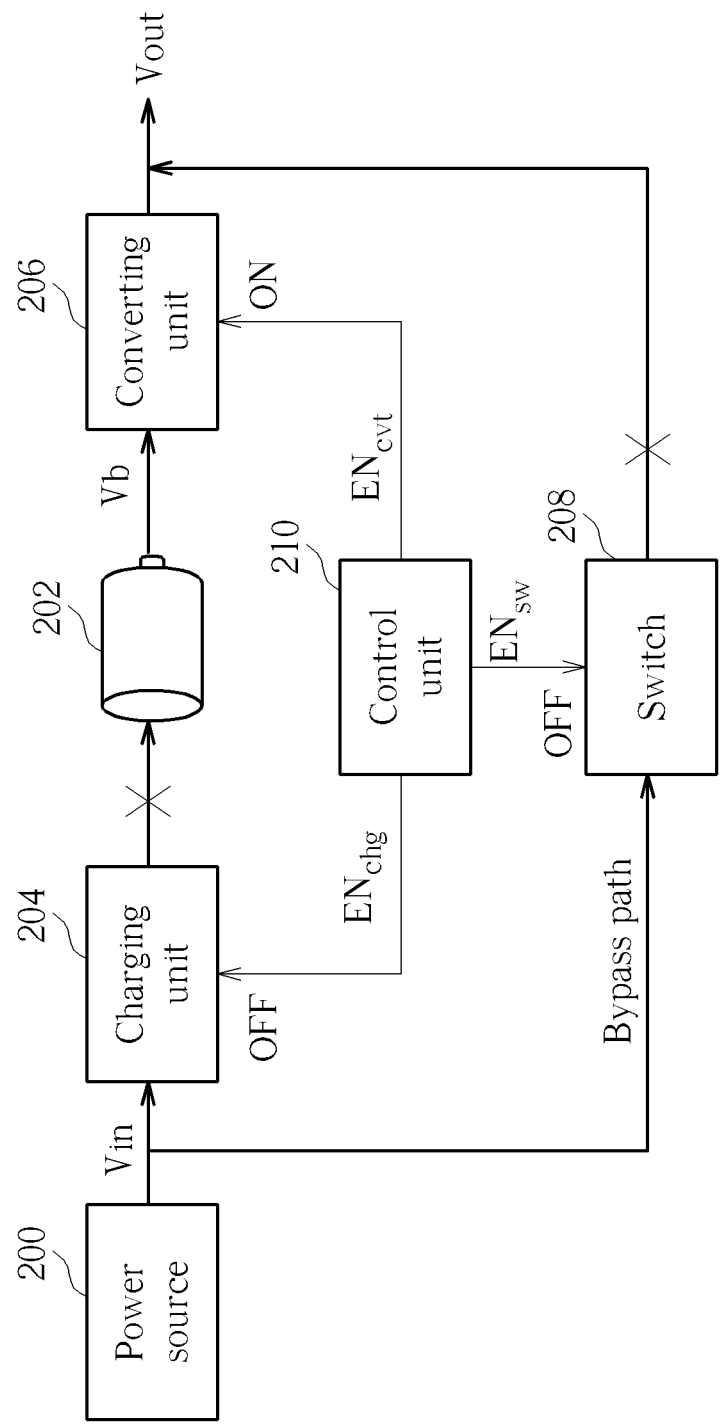
FIG. 6 is a schematic diagram of a function of the power supply system according to a fourth embodiment of the present invention.

Please refer to FIG. 6, which is a schematic diagram of a function of the power supply system 20 according to a fourth embodiment of the present invention. As shown in FIG. 6, the control signal $EN_{chg}$ is off, $EN_{cvt}$ is on, and $EN_{sw}$ is off. In such a condition, the charging unit 204 stops charging the rechargeable battery module 202, the converting unit 206 is turned on, and the switch 208 is turned off. The control signal $EN_{cvt}$ is on, indicating that the rechargeable battery module 202 provides the output power Vout through the converting unit 206. The control signal $EN_{chg}$ and $EN_{sw}$ are both off, indicating that the power source 200 may be removed. At this moment time, the rechargeable battery module 202 has electric charges quantity and can still provide the output power Vout through the converting unit 206. On the other hand, this case may also be feasible when the power source 200 is ready, wherein the voltage requirement for the output power Vout is far from the voltage of the input power Vin, and thus the bypass path can not be utilized. As a result, the power efficiency may be equal to the conventional case.

Figure 7:
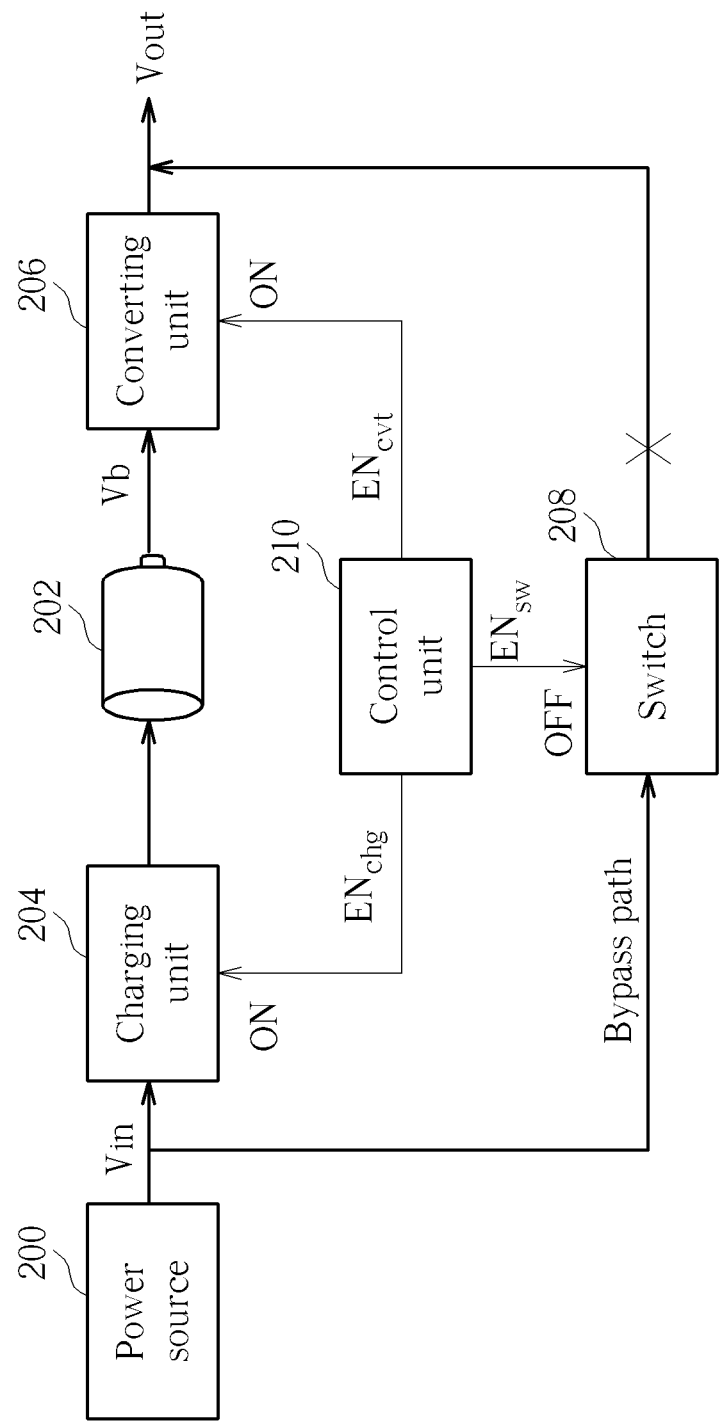
FIG. 7 is a schematic diagram of a function of the power supply system according to a fifth embodiment of the present invention.

Please refer to FIG. 7, which is a schematic diagram of a function of the power supply system 20 according to a fifth embodiment of the present invention. As shown in FIG. 7, the control signal $EN_{chg}$ is on, $EN_{cvt}$ is on, and $EN_{sw}$ is off. In such a condition, the charging unit 204 is charging the rechargeable battery module 202, the converting unit 206 is turned on, and the switch 208 is turned off. The control signal $EN_{chg}$ is on, indicating that the power source 200 is ready and the rechargeable battery module 202 is charged by the charging unit 204. The control signal $EN_{cvt}$ is on, indicating that the rechargeable battery module 202 provides the output power Vout through the converting unit 206. The power source 200 is ready now, but the voltage requirement for the output power Vout may be far from the voltage of the input power Vin, and thus the bypass path can not be utilized. As a result, when the output power Vout is provided by the rechargeable battery module 202, the power efficiency may be equal to the conventional case.

Figure 8:
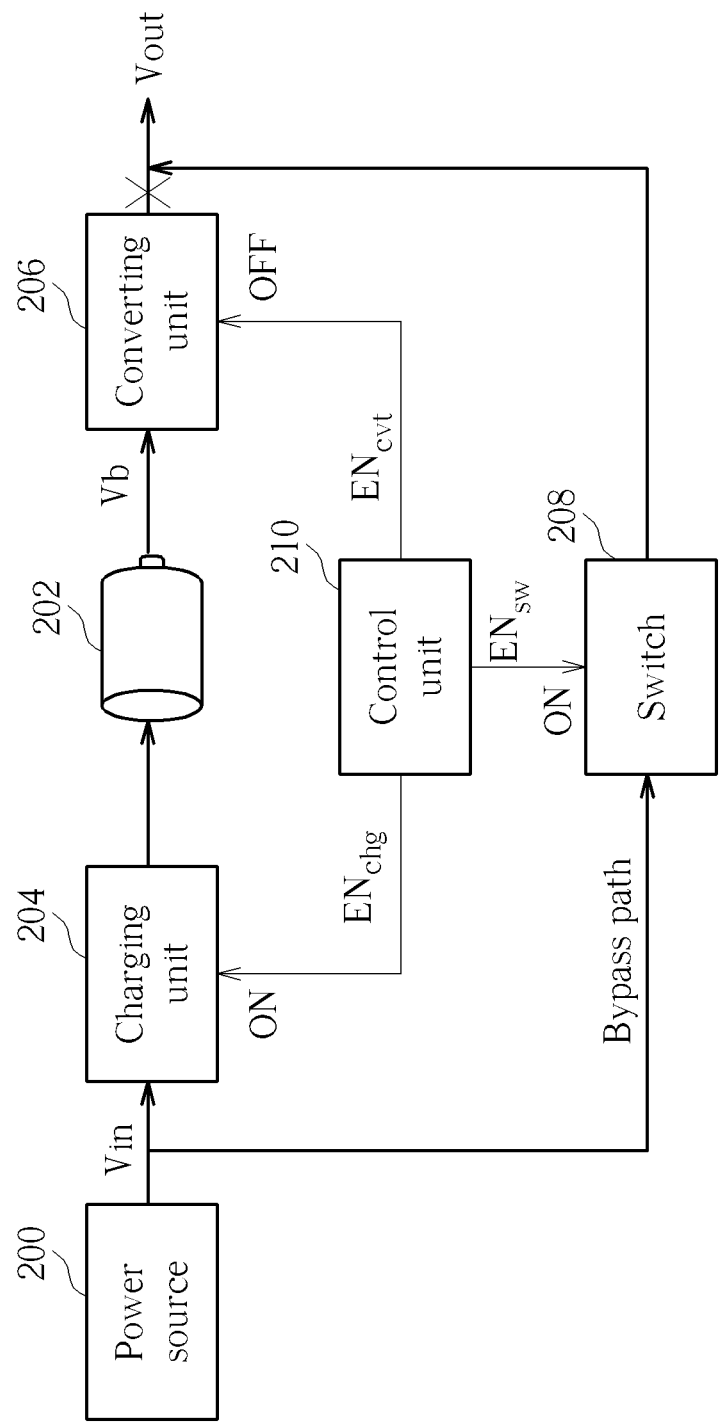
FIG. 8 is a schematic diagram of a function of the power supply system according to a sixth embodiment of the present invention.

Please refer to FIG. 8, which is a schematic diagram of a function of the power supply system 20 according to a sixth embodiment of the present invention. As shown in FIG. 8, the control signal $EN_{chg}$ is on, $EN_{cvt}$ is off, and $EN_{sw}$ is on. In such a condition, the charging unit 204 is charging the rechargeable battery module 202, the converting unit 206 is turned off, and the switch 208 is turned on. The control signal $EN_{chg}$ is on, indicating that the power source 200 is ready and the rechargeable battery module 202 is charged by the charging unit 204. The switch $EN_{sw}$ is on, indicating that the power source 200 also provides the output power Vout through the switch 208. In this case, the input power Vin is configurable between the rechargeable battery module 202 and the switch 208, i.e. currents flowing through the charging unit 204 and the bypass path are configurable and can be controlled by the control signals $EN_{chg}$ and $EN_{sw}$. In some embodiments, the control signals $EN_{chg}$ and $EN_{sw}$ may control the currents flowing through the charging unit 204 and the bypass path according to a status of a battery in the rechargeable battery module 202. For example, if the battery is near empty, the control signal $EN_{chg}$ may configure more current to the rechargeable battery module 202, and thus less current may flow through the bypass path. If the battery is near full, the control signal $EN_{chg}$ may configure less current to the rechargeable battery module 202, and thus more current may flow through the bypass path. In other embodiments, the control signals $EN_{chg}$ and $EN_{sw}$ may control the currents flowing through the charging unit 204 and the bypass path according to the source current capability of the input power Vin. For example, suppose that the current requirement of the output power Vout is 2 A. If the source current capability of the input power Vin is 3 A, 2 A current may flow through the bypass path, and additional 1 A current may flow through the charging unit 204. If the source current capability of the input power Vin is 4 A, 2 A current may flow through the bypass path, and additional 2 A current may flow through the charging unit 204.

Please note that, the control signals $EN_{cvt}$ and $EN_{sw}$ may not be on at the same time; that is, the rechargeable battery module 202 and the power source 200 may not provide the output power Vout at the same time. Furthermore, if the voltage requirement of the output power Vout is far from the voltage of the input power Vin, the output power Vout can not be provided by the power source 200 through the switch 208 (i.e. bypass the input power Vin). Only the rechargeable battery module 202 can provide the output power Vout through the converting unit 206 (i.e. the battery power Vb). On the other hand, if the voltage requirement of the output power Vout is close to the voltage of the input power Vin, the output power Vout can be provided by both the power source 200 (i.e. bypass the input power Vin) and the rechargeable battery module 202 (i.e. the battery power Vb). The output voltage of the converting unit 206 may be optional, and hence flexibility of the power supply system 20 can be achieved. In such a condition, if the power source 200 is not ready, the output power Vout should be provided by the rechargeable battery module 202. If the power source 200 is ready, the output power Vout is preferably provided by the power source 200 through the switch 208 (i.e. bypass the input power Vin). As a result, the output current can go through the bypass path and power efficiency may be increased. Therefore, temperature may fall, and battery life may be increased.

Noticeably, the spirit of the present invention is to increase power efficiency by bypassing current through a switch without any conversion in a power supply system. Those skilled in the art can make modifications and alterations accordingly. For example, the converting unit 206 can be a boost converter, a buck converter, a buck-boost converter, a low drop-out (LDO) regulator, or a power switch according to system requirements. The charging unit 204 can be a boost converter, a buck converter, a buck-boost converter, or a low drop-out (LDO) regulator according to system requirements. In addition, the rechargeable battery module 202 may contain one or more batteries for storing the electric charges. Furthermore, the control signals $EN_{chg}$, $EN_{cvt}$, and $EN_{sw}$ are representative signals for controlling the charging unit 204 to start or stop charging, the converting unit 206 to be turned on or off, and the switch to be turned on or off, respectively. These three control signals or other control signals may also be utilized to control other functions, such as charging current capability of the charging unit 204, output voltage of the converting unit 206, bypass current capability of the switch 208, etc.

In the prior art, the conventional battery power supply system 10 converts the input power Vin to the battery power Vb, and then converts the battery power Vb to the output power Vout. There may be power loss during the power conversion. In comparison, the present invention provides power configuration between a rechargeable battery module and a bypass path, and flexibility between battery power charging mode and bypass power charging mode. When the voltage of the output power Vout is close to the voltage of the input power Vin, the power source 200 can provide the output power Vout through the switch 208, and current can pass through the switch 208 without any conversion. As a result, power efficiency may be increased. Therefore, temperature may fall, and battery life may be increased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A configurable power supply system, comprising:
   a power source, for providing input power;
   a switch, coupled to the power source, for enabling a bypass path for outputting the input power to an output node as an output power when turned on;
   a rechargeable battery module, for storing the input power and outputting a battery power;
   a charging unit, coupled between the power source and the rechargeable battery module, for charging the rechargeable battery module with the input power;
   a converting unit, coupled to the rechargeable battery module, for converting the battery power to generate the output power; and
   a control unit, coupled to the switch, the charging unit, and the converting unit, for controlling functions of the switch, the charging unit, and the converting unit;
   wherein the control unit controls a current provided for the charging unit for charging the rechargeable battery module, to control the functions of the charging unit, the control unit further determining a relationship between a voltage of the output power and a voltage of the input power;
   wherein when the voltage of the output power is far from the voltage of the input power, the control unit controls the switch to be turned off and the converting unit to be turned on, for outputting the output power by converting the battery power to generate the output power; and when the voltage of the output power is close to the voltage of the input power, the control unit controls the switch to be turned on and the converting unit to be turned off, for outputting the output power by passing the input power through the bypass path to generate the output power, or controls the switch to be turned off and the converting unit to be turned on, for outputting the output power by converting the battery power to generate the output power.

2. The power supply system of claim 1, wherein the switch comprises a metal-oxide-semiconductor field effect transistor (MOSFET).

3. The power supply system of claim 1, wherein the converting unit is a boost converter, for boosting a voltage of the battery power to generate the output power.

4. The power supply system of claim 1, wherein the control unit controls the switch to be turned on or off, to control the functions of the switch.

5. The power supply system of claim 1, wherein the control unit controls the charging unit to start or stop charging the rechargeable battery module, to control the functions of the switch.

6. The power supply system of claim 1, wherein the control unit further controls the current according to a status of a battery in the rechargeable battery module.

7. The power supply system of claim 1, wherein the control unit further controls the current according to a source current provided by the power source.

8. The power supply system of claim 1, wherein the control unit controls the converting unit to be turned on or off, to control the functions of the converting unit.

9. The power supply system of claim 1, wherein the control unit is a microcontroller unit (MCU).

10. A method of configuring power supply, comprising:
providing input power;
enabling a bypass path for outputting the input power to an output node as output power;
charging a rechargeable battery module with the input power for storing the input power for outputting a battery power;
converting the battery power to generate the output power; and
determining a relationship between a voltage of the output power and a voltage of the input power, wherein when the voltage of the output power is far from the voltage of the input power, outputting the output power by converting the battery power to generate the output power; and when the voltage of the output power is close to the voltage of the input power, outputting the output power by passing the input power through the bypass path to generate the output power, or by converting the battery power to generate the output power;
wherein charging the rechargeable battery module with the input power for storing the input power for outputting the battery power comprises:
controlling a current for charging the rechargeable battery module.

11. The method of claim 10, wherein converting the battery power to generate the output power comprises boosting a voltage of the battery power to generate the output power.

12. The method of claim 10, further comprising controlling the current for charging the rechargeable battery module according to a status of a battery in the rechargeable battery module.

13. The method of claim 10, further comprising controlling the current for charging the rechargeable battery module according to a source current provided by the power source.

* * * * *